United States Patent
Fu et al.

(10) Patent No.: US 10,187,839 B2
(45) Date of Patent: Jan. 22, 2019

(54) APPARATUS AND METHOD FOR CONTROLLING SOFT HANDOVER RATE

(71) Applicant: Huawei Technologies Co., Ltd., Shenzhen (CN)

(72) Inventors: Keyuan Fu, Xi'an (CN); Gaohu Wang, Xi'an (CN); Jun Cheng, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 92 days.

(21) Appl. No.: 15/346,499

(22) Filed: Nov. 8, 2016

(65) Prior Publication Data

US 2017/0055196 A1    Feb. 23, 2017

Related U.S. Application Data (63) Continuation of application No. PCT/CN2014/077068, filed on May 8, 2014.

(51) Int. Cl.
*H04W 36/24* (2009.01)
*H04W 36/26* (2009.01)
(Continued)

(52) U.S. Cl.
CPC ........... *H04W 36/26* (2013.01); *H04L 5/0048* (2013.01); *H04L 5/0053* (2013.01);
(Continued)

(58) Field of Classification Search
CPC ..... H04W 36/26; H04W 36/18; H04W 24/10; H04W 72/042; H04W 16/10;
(Continued)

(56) References Cited

U.S. PATENT DOCUMENTS 6,160,798 A    12/2000 Reed et al.
6,445,917 B1 *   9/2002 Bark ................. H04W 24/00
                                                          370/331
(Continued)

FOREIGN PATENT DOCUMENTS

CN    1738475 A    2/2006
CN    1984447 A    6/2007
(Continued)

*Primary Examiner* — Phuc H Tran
(74) *Attorney, Agent, or Firm* — Leydig, Voit & Mayer, Ltd.

(57) ABSTRACT

This disclosure provides an apparatus and a method for controlling a soft handover rate. A distribution of cell signal strengths that is received by user equipment is obtained through analysis of measurement reports of the user equipment, a mapping relationship between soft handover parameters and air interface quality is determined, and the soft handover parameters are adjusted according to the mapping relationship. Adjusting soft handover parameters of a cell according to signal quality of the cell can reduce a soft handover rate and increase a capacity on a premise that communication quality is maintained. Further, after the soft handover rate is adjusted according to the air interface quality, monitoring of the air interface quality, and by modifying specific cell handover parameters, communication quality of the user equipment that performs a soft handover is maintained, and a balance between increasing the system capacity and maintaining the communication quality is achieved.

16 Claims, 4 Drawing Sheets

(51) Int. Cl.
*H04W 16/04* (2009.01)
*H04W 16/10* (2009.01)
*H04W 72/04* (2009.01)
*H04L 5/00* (2006.01)
*H04L 5/14* (2006.01)
*H04W 24/10* (2009.01)
*H04W 36/18* (2009.01)

(52) U.S. Cl.
CPC ........... *H04L 5/1469* (2013.01); *H04W 16/04* (2013.01); *H04W 16/10* (2013.01); *H04W 24/10* (2013.01); *H04W 36/18* (2013.01); *H04W 72/042* (2013.01)

(58) Field of Classification Search
CPC .... H04W 16/04; H04L 5/0048; H04L 5/1469; H04L 5/0053
See application file for complete search history.

(56) References Cited

U.S. PATENT DOCUMENTS

| | | | |
|---|---|---|---|
| 2002/0068571 A1 | 6/2002 | Ohlsson et al. | |
| 2003/0064729 A1 | 4/2003 | Yamashita | |
| 2006/0171296 A1 | 8/2006 | Agiwal et al. | |
| 2007/0121552 A1 | 5/2007 | Lindoff | |
| 2009/0047961 A1* | 2/2009 | Kim | H04W 36/0083 455/436 |
| 2010/0234014 A1* | 9/2010 | Virkki | H04W 36/0088 455/423 |
| 2010/0272268 A1* | 10/2010 | Sambhwani | H04W 36/0055 380/287 |
| 2011/0059741 A1* | 3/2011 | Klein | H04W 36/30 455/436 |
| 2012/0046026 A1 | 2/2012 | Chande et al. | |
| 2013/0252620 A1 | 9/2013 | Kobayashi et al. | |

FOREIGN PATENT DOCUMENTS

| | | |
|---|---|---|
| CN | 103686907 A | 3/2014 |
| JP | 2002532950 A | 10/2002 |
| JP | 2003070055 A | 3/2003 |
| JP | 2004064539 A | 2/2004 |
| JP | 2006279626 A | 10/2006 |
| JP | 2013520932 A | 6/2013 |
| WO | WO 2004025975 A2 | 3/2004 |
| WO | WO 2010034354 A1 | 4/2010 |
| WO | 2012081150 A1 | 6/2012 |

* cited by examiner

APPARATUS AND METHOD FOR CONTROLLING SOFT HANDOVER RATE

CROSS-REFERENCE TO RELATED APPLICATIONS

This application is a continuation of International Application No. PCT/CN2014/077068, filed on May 8, 2014, the disclosure of which is hereby incorporated by reference in its entirety.

TECHNICAL FIELD

Embodiments of the present invention relate to the field of wireless communications, and in particular, to an apparatus and a method for controlling a soft handover rate.

BACKGROUND

A cell handover (Channel Switch) refers to channel switching that is performed to maintain communication continuity when user equipment (UE, User Equipment) moves from one cell to another cell. How to successfully and quickly complete a cell handover is one of focuses of cellular cell system design in a wireless communications system.

As a main cell handover technology, a soft handover technology means that UE first establishes a link to a target cell, and then disconnects a link to a source cell, which may reduce a possibility of communication interruption. The soft handover technology is mainly applied to a communications system using an intra-frequency networking mode. During a soft handover, the system additionally configures resources for the UE to improve communication quality of the UE in the soft handover process.

In the prior art, generally, a soft handover rate of a cell is preset during cell planning, that is, a ratio of resources occupied by UE that establishes link connections to at least two cells is preset. If a higher soft handover rate is set, usage of system resources is higher. If an excessively high soft handover rate is set, a system capacity is reduced because an excessive amount of system resources are occupied. If an excessively low soft handover rate is set, interruption may occur in communication of some users, a call drop rate of the cell is increased, and communication quality is affected. Therefore, a method capable of adjusting the soft handover rate properly according to an actual running status of the system is needed to optimize system performance.

SUMMARY

Embodiments of the present invention provide an apparatus and a method for controlling a soft handover rate, which can adjust the soft handover rate properly according to an actual running status of a system.

According to a first aspect, an embodiment of the present invention provides an apparatus for controlling a soft handover rate, including:

a first calculation unit, configured to determine, according to a first measurement report reported by user equipment UE, a signal strength difference between an original serving cell of the UE and a first neighboring cell of the original serving cell, where the first measurement report includes signal strength values of the original serving cell and the neighboring cell that are obtained through measurement by the UE, and the original serving cell and the first neighboring cell belong to an active set of the UE;

a counting unit, configured to count a quantity of the first measurement reports reported by the UE in a particular period, where the counting unit is further configured to count a quantity of second measurement reports, where the second measurement reports are the first measurement reports in which the signal strength difference is less than or equal to a first threshold;

a second calculation unit, configured to calculate a probability distribution of the second measurement reports in the first measurement reports;

a mapping unit, configured to map the probability distribution to a soft handover rate of the original serving cell; and a parameter adjustment unit, configured to adjust soft handover parameters so as to reach the soft handover rate.

In a first possible implementation manner of the first aspect, the second calculation unit is specifically configured to:

calculate the probability distribution of the second measurement reports in the first measurement reports according to a formula $$P_k = \sum_{t=0}^{t=k} N_k / \text{Sum},$$

where k indicates the signal strength difference (k≥0 and k is an integer), $N_k$ indicates a quantity of the second measurement reports corresponding to the signal strength difference, and Sum indicates a quantity of the first measurement reports.

With reference to any one of the foregoing possible implementation manners of the first aspect, the first calculation unit is specifically configured to: determine signal strength differences between the original serving cell and n (n≥1) first neighboring cells, where the serving cell and the first neighboring cells are in a same active set, and the n (n≥1) first neighboring cells are sorted in descending order of signal strength values.

With reference to any one of the foregoing possible implementation manners of the first aspect, the first calculation unit is specifically configured to:

determine signal strength differences between the original serving cell and n (n≥1) first neighboring cells, where the serving cell and the first neighboring cells are in a same active set, and the n (n≥1) first neighboring cells are sorted in descending order of signal strength values.

With reference to any one of the foregoing possible implementation manners of the first aspect, the mapping unit is specifically configured to:

map the probability distribution to the soft handover rate of the serving cell according to a formula $$f(k) = \sum_{i=1}^{i=n} P_{i,k},$$

where k indicates the signal strength difference (k>0), i indicates sequence numbers of n (n≥2) neighboring cells sorted in descending order of the signal strength values, and $P_{i,k}$ indicates the probability distribution, in the first measurement reports, of the second measurement reports corresponding to the first neighboring cells.

With reference to any one of the foregoing possible implementation manners of the first aspect, the parameter adjustment unit is specifically configured to adjust a threshold for an event 1A and a threshold for an event 1B.

With reference to any one of the foregoing possible implementation manners of the first aspect, a statistical matrix of the quantity of the first measurement reports, the signal strength value of the original serving cell, and signal strength differences between the original serving cell and second neighboring cells is established, where the second neighboring cells include the first neighboring cells;

a third calculation unit is configured to calculate a cumulative probability distribution of the first measurement reports according to a formula $$P(J, K) = \sum_{j=J_{min}}^{j=J} A(j, K) \bigg/ \sum_{j=J_{min}}^{j=j_{max}} A(j, K),$$

where J indicates the signal strength value of the original serving cell, and K indicates the signal strength difference between the original serving cell and the neighboring cell;

a fourth calculation unit is configured to calculate a corresponding K value by substituting a preset second threshold and a preset third threshold into the formula $$P(j, K) = \sum_{j=J}^{j=j_{max}} A(j, K) \bigg/ \sum_{j=J_{min}}^{j=j_{max}} A(j, K),$$

where the second threshold indicates an expected value of the signal strength value of the original serving cell, and the third threshold indicates an expected value of the probability distribution of the first measurement reports; and the parameter adjustment unit is further configured to adjust a cell individual offset CIO according to the K value.

With reference to any one of the foregoing possible implementation manners of the first aspect, the parameter adjustment unit is specifically configured to calculate a difference between the K value and the adjusted threshold for 1A to obtain the CIO.

With reference to any one of the foregoing possible implementation manners of the first aspect, that the fourth calculation unit is configured to calculate a corresponding K value according to the second threshold and the third threshold includes: if multiple K values are obtained through calculation, selecting a minimum K value.

With reference to any one of the foregoing possible implementation manners of the first aspect, the signal strength value includes a ratio of energy per modulating bit to the noise spectral density Ec/No, or received signal code power RSCP.

According to a second aspect, an embodiment of the present invention provides a method for controlling a soft handover rate, including: determining, according to a first measurement report reported by user equipment UE, a signal strength difference between an original serving cell of the UE and a neighboring cell of the original serving cell, where the first measurement report includes signal strength values of the original serving cell and the neighboring cell that are obtained through measurement by the UE, and the original serving cell and the neighboring cell belong to an active set of the UE; counting a quantity of the first measurement reports reported by the UE in a particular period; counting a quantity of second measurement reports, where the second measurement reports are the first measurement reports in which the signal strength difference is less than or equal to a first threshold; calculating a probability distribution of the second measurement reports in the first measurement reports; acquiring a soft handover rate of the original serving cell according to the probability distribution; and adjusting soft handover parameters so as to reach the soft handover rate.

In a first possible implementation manner of the second aspect, the calculating a probability distribution of the second measurement reports in the first measurement reports includes:

calculating the probability distribution of the second measurement reports in the first measurement reports according to a formula $$P_k = \sum_{t=0}^{t=k} N_k / \text{Sum},$$

where k indicates the signal strength difference (k≥0 and k is an integer), $N_k$ indicates a quantity of the second measurement reports corresponding to the signal strength difference, and Sum indicates a quantity of the first measurement reports.

With reference to any one of the foregoing possible implementation manners of the second aspect, the determining a signal strength difference between an original serving cell of the UE and a neighboring cell of the original serving cell includes:

determining signal strength differences between the serving cell of the UE and n (n≥1) neighboring cells, where the serving cell and the neighboring cells are in the same active set, and the n (n≥1) neighboring cells are sorted in descending order of signal strength values.

With reference to any one of the foregoing possible implementation manners of the second aspect, the acquiring a soft handover rate of the original serving cell according to the probability distribution includes: mapping the probability distribution to the soft handover rate of the serving cell according to a formula $$f(k) = \sum_{i=1}^{i=n} P_{i,k},$$

where k indicates the signal strength difference (k>0), i indicates sequence numbers of n (n≥2) neighboring cells sorted in descending order of the signal strength values, and $P_{i,k}$ indicates the probability distribution, in the first measurement reports, of the second measurement reports corresponding to the neighboring cells.

With reference to any one of the foregoing possible implementation manners of the second aspect, the adjusting soft handover parameters includes: adjusting a threshold for an event 1A and a threshold for an event 1B.

With reference to any one of the foregoing possible implementation manners of the second aspect, after the adjusting soft handover parameters so as to reach the soft handover rate, the method further includes: establishing a statistical matrix of the quantity of the first measurement reports, the signal strength value, of the original serving cell, measured by the UE, and the signal strength difference between the original serving cell and the neighboring cell;

calculating the probability distribution rate according to a formula $$P(J, K) = \sum_{j=j_{min}}^{j=J} A(j, K) \Big/ \sum_{j=j_{min}}^{j=j_{max}} A(j, K),$$

where J indicates the signal strength value of the original serving cell, and K indicates the signal strength difference between the original serving cell and the neighboring cell;

setting a second threshold and a third threshold, where the second threshold is used to indicate the signal strength value of the original serving cell corresponding to a soft handover of the UE, and the third threshold is used to indicate a probability distribution rate corresponding to air interface quality; and calculating a corresponding K value by substituting the preset second threshold and third threshold into the formula $$P(j, K) = \sum_{j=J}^{j=j_{max}} A(j, K) \Big/ \sum_{j=j_{min}}^{j=j_{max}} A(j, K),$$

where the second threshold indicates the signal strength value of the original serving cell, and the third threshold indicates an expected value of the probability distribution of the first measurement reports; and adjusting a cell individual offset CIO according to the K value.

With reference to any one of the foregoing possible implementation manners of the second aspect, the adjusting a CIO according to the K value includes: calculating a difference between the K value and the adjusted threshold for 1A to obtain the CIO.

With reference to any one of the foregoing possible implementation manners of the second aspect, the calculating a corresponding K value by substituting the preset second threshold and third threshold into the formula $$P(j, K) = \sum_{j=J}^{j=j_{max}} A(j, K) \Big/ \sum_{j=j_{min}}^{j=j_{max}} A(j, K)$$

includes:

if multiple K values are obtained through calculation, selecting a minimum K value.

With reference to any one of the foregoing possible implementation manners of the second aspect, the signal strength value includes a ratio of energy per modulating bit to the noise spectral density EcNo, or received signal code power RSCP.

With the technical solutions disclosed by the embodiments of the present invention, a distribution of cell signal strengths that is received by user equipment is obtained according to measurement reports, a mapping relationship between soft handover parameters and air interface quality is determined, and the soft handover parameters are adjusted according to the mapping relationship, so that an expected soft handover rate is reached. Adjusting soft handover parameters of a cell dynamically according to signal quality of the cell can reduce communication resources, increase a system capacity, and optimize system performance on a premise that communication quality is ensured.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the implementation manners of the present invention in detail with reference to the accompanying drawings.

Each technology described in the specification may be used in various communications systems using a soft handover technology, such as a Code Division Multiple Access (CDMA, Code Division Multiple Access) system, a Wideband Code Division Multiple Access (WCDMA, Wideband Code Division Multiple Access) system, and a Time Division-Synchronous Code Division Multiple Access (TD-SCDMA, Time Division-Synchronous Code Division Multiple Access) system.

A deployment location of an apparatus for controlling a soft handover rate provided by an embodiment of the present invention is not limited. The apparatus may be deployed alone, or may be deployed jointly with a base station control device. In other words, the apparatus may be an independent device, or may be deployed in a base station control device as a functional module. For example, the apparatus may be deployed in a base station control device such as a base station controller (BSC, Base Station Controller) in CDMA or a radio network controller (RNC, Radio Network Controller) in TD-SCDMA or WCDMA, or may be an independently deployed device that may exchange information with the foregoing various base station control devices, which is not limited in the embodiment of the present invention.

Figure 1:
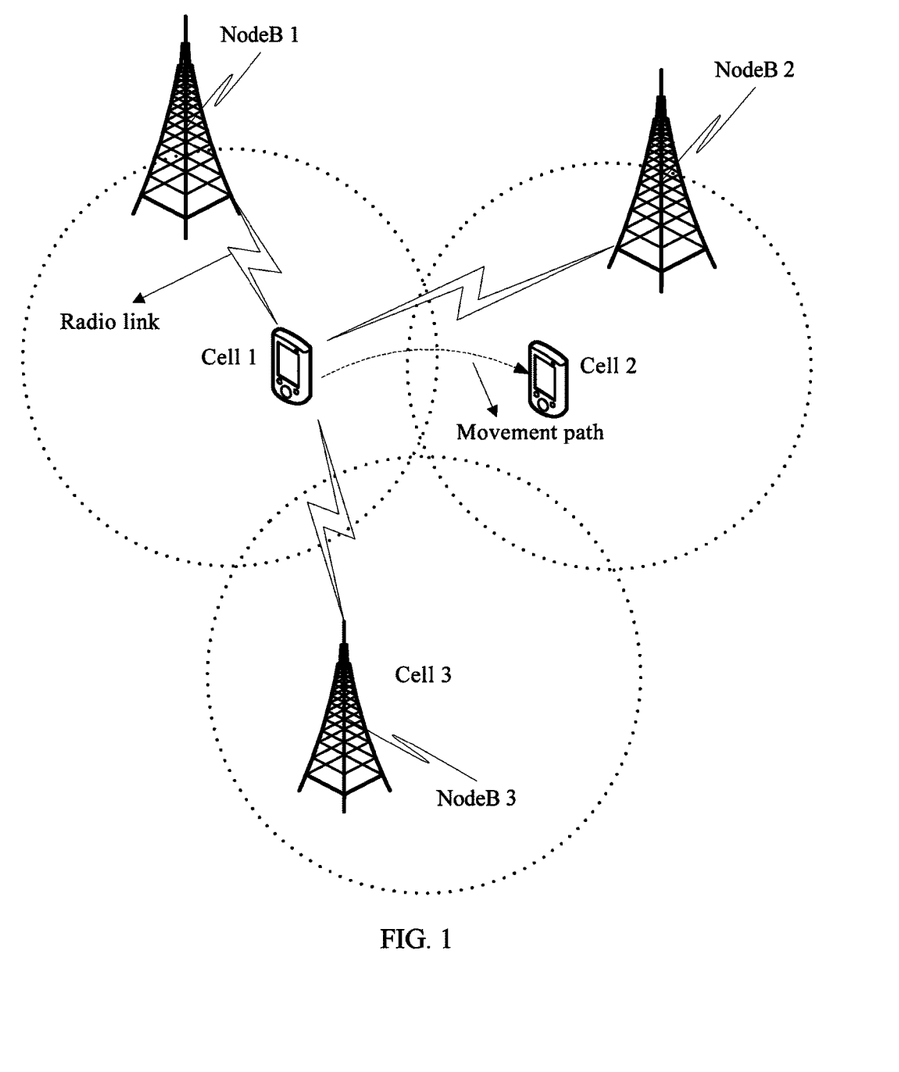
FIG. 1 is a schematic diagram of a scenario in which user equipment performs a soft handover process.

FIG. 1 is a schematic diagram of a scenario in which UE performs a soft handover in a WCDMA system. As shown in FIG. 1, a cell 1, a cell 2, and a cell 3 are cells neighboring to each other, and referred to as "neighboring cells" for short. Neighboring cells and neighboring cells that appear in the embodiment of the present invention have the same meaning. The cell 1 is managed by a NodeB 1. The cell 2 is managed by a NodeB 2. The cell 3 is managed by a NodeB 3. The cell 1, the cell 2, and the cell 3 may respectively perform communication with the UE by using radio links. Assuming that the cell 1 is a serving cell of the UE, the cell 1 belongs to a reference cell (Primary Cell) in an active set of the UE, and the cell 2 and the cell 3 belong to a neighboring cell set of the UE. In a movement process of the UE, the UE measures a signal strength of each cell, and the cell 2 and the cell 3 become cells in a monitored set of the UE. When the measured signal strength of the cell 2 or the cell 3 reaches a threshold for triggering an event 1A, the UE may report a measurement report (Measurement Report) to the RNC, and the RNC determines, according to the measurement report, whether the signal strength of the cell 2 or the cell 3 meets a soft handover threshold. Assuming that the signal strength of the cell 2 exceeds the soft handover threshold, the RNC notifies the UE that the UE may establish a radio resource control (RRC, Radio Resource Control) connection with the cell 2, and adds the cell 2 to the active set of the UE. Then the UE establishes an air interface link with the cell 2. Meanwhile, the UE maintains an air interface link connection with the cell 1, and starts a soft handover process. The UE continues moving. When the signal strength of the cell 2 is greater than that of the cell 1 used as a reference cell, the RNC is triggered to decide whether the cell 2 replaces the cell 1 to become a new reference cell of the UE. If updating succeeds, the cell 1 becomes a normal cell in the active set, and the RNC instructs the UE to define a neighboring cell set according to the new reference cell in time. An indication of soft handover completion is that the active set includes only one reference cell, namely, the serving cell of the UE. If more than one cell is included, it is considered that the soft handover process is being performed.

In one cell, multiple UEs may perform communication services simultaneously, and each UE may have a soft handover requirement. Normally, during cell planning, a soft handover rate of a cell may be predetermined according to a condition such as a user quantity, signal strength, or a system resource status in the cell. Soft handover rate= [Traffic carried on traffic channel (including handover)– Traffic carried on traffic channel (not including handover)]/ Traffic carried on traffic channel (not including handover) *100%. Traffic carried on a traffic channel refers to traffic generated by all voice, SMS and data services on the traffic channel in a statistical period. In some scenarios in which communication quality is high enough, when the UE moves between cells, a soft handover may be unnecessary, and therefore, the system does not need to configure additional communication resources for the UE. If an excessively high soft handover rate is set, the UE is caused to occupy a lot of system resources in a soft handover process, and a system capacity is reduced.

Figure 2:
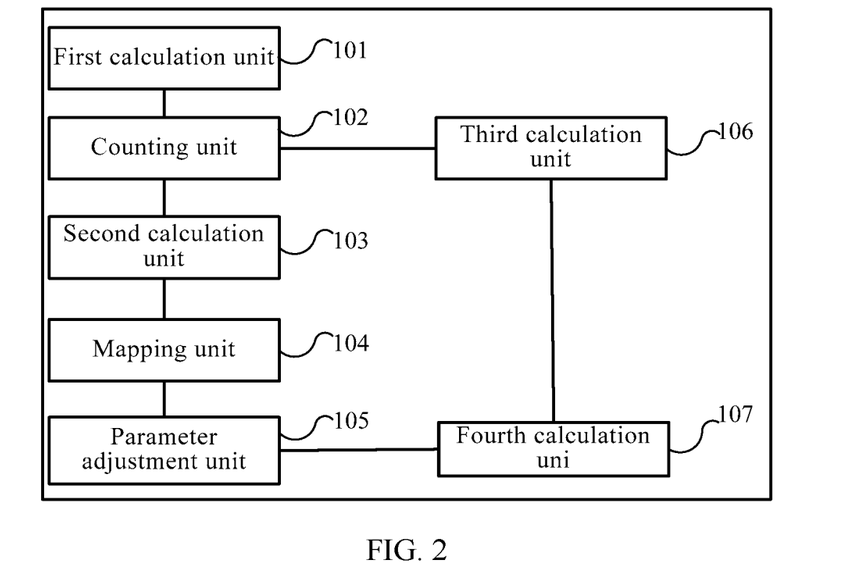
FIG. 2 is a schematic diagram of an apparatus for controlling a soft handover rate according to an embodiment of the present invention.

An embodiment of the present invention provides an apparatus for controlling a soft handover rate shown in FIG. 2, where the apparatus includes:

A first calculation unit 101 is configured to determine, according to a first measurement report reported by UE, a signal strength difference between an original serving cell of the UE and a first neighboring cell of the original serving cell, where the first measurement report includes signal strength values that are obtained by the UE through measurement, of the original serving cell and the first neighboring cell, and the original serving cell and the first neighboring cell belong to an active set of the UE.

Optionally, the signal strength value may be represented by a ratio of energy per modulating bit to the noise spectral density (Ec/No, Ratio of Energy Per Modulating Bit to the Noise Spectral Density) or received signal code power (RSCP, Received Signal Code Power). A value of Ec/No or a value of RSCP may be obtained by the UE by directly measuring a pilot of each neighboring cell.

The first measurement report may be reported by the UE to a base station periodically or based on event triggering, and then sent by the base station to the apparatus, or sent by the base station to a base station control device and then forwarded to the apparatus.

A counting unit 102 is configured to count a quantity of the first measurement reports reported by the UE in a particular period.

A statistical period may be determined according to a network running requirement, which is not particularly limited in the embodiment of the present invention. In consideration of reducing system computing resources, counting and data updating may be performed once every hour.

Optionally, in another embodiment, a base station may count the quantity of the first measurement reports, and sends a counting result to the apparatus, or sends a counting result to the apparatus through a base station control device.

It should be noted that the periodic reporting refers to periodic reporting after event triggering, where the event and the event in reporting based on event triggering may be a same event. The event triggering includes: triggering an event 1A for measurement reporting. The event 1A indicates that communication quality of a target cell becomes better and enters a reporting range relative to quality of the active set. The event 1A may be used to indicate that the cell is added to the active set.

Further, the counting unit 102 may be further configured to count the quantity of first measurement reports reported in a particular period by all UEs in a cell of each base station managed by a same base station control device.

The counting unit 102 is further configured to count a quantity of second measurement reports, where the second measurement reports are the first measurement reports in which the signal strength difference is less than or equal to a first threshold.

A soft handover process has a particular requirement on a signal strength difference between two cells, that is, the UE can perform a soft handover only when a signal strength difference between a cell in the monitored set and the serving cell falls within a particular range. Therefore, a signal quality difference between each neighboring cell and the serving cell is counted, and a probability distribution of related measurement reports is calculated, so that a distribution of UEs meeting a soft handover condition and coverage of a network may be learned.

A value of the first threshold may be determined according to signal quality in an area and a signal difference between two neighboring cells in which a soft handover of the UE may occur, which is not particularly limited in the embodiment of the present invention. For example, the value may be between 0 dB and 10 dB or between 0 dB and 20 dB. Optionally, in an actual application, multiple first thresholds may be set, and a quantity of measurement reports corresponding to a signal difference interval is counted and recorded, where the multiple first thresholds may be increased according to a particular extent. For example, assuming that the value of the first threshold is between 0 dB and 20 dB, the first threshold may be set to 1 dB, 2 dB, 3 dB, . . . , 20 dB in sequence, and corresponding signal difference intervals are [0 dB, 1 dB], [0 dB, 2 dB], [0 dB, 3 dB], . . . , [0 dB, 20 dB]. The extent of increase of the first threshold may be determined according to a system running status and a requirement of statistics, and is not particularly limited in the embodiment of the present invention. As specified in an existing protocol, a smallest extent of increase is 0.5 dB.

It should be noted that in the embodiment of the present invention, [0 dB, 1 dB] indicates that a signal strength difference between two neighboring cells is 0 dB or 1 dB, and [0 dB, 2 dB] indicates that a signal strength difference between two neighboring cells is 0 dB or 1 dB or 2 dB, and so on, that is, a signal strength difference between two neighboring cells is an integer in a corresponding signal difference interval.

Optionally, the first calculation unit 101 may be specifically configured to determine signal strength differences between cells in the active set of the UE, where the active set includes the original serving cell and n (n≥1) first neighboring cells, and the cells in the active set are sorted in descending order of signal strength values.

As described above, when the UE moves continuously, the signal strength of each cell measured by the UE also changes according to the location of the UE. Therefore, the reference cell and normal cell in the active set are updated correspondingly, the original serving cell of the UE may change from a reference cell to a normal cell, and the first neighboring cell added to the active set may change from a normal cell to a reference cell. The original serving cell and the first neighboring cell are sorted according to signal strengths, so that the reference cell and the normal cell may be updated.

In an example in which Ec/No is used as a measurement quantity of a signal strength, the first calculation unit 101 may be specifically configured to sort n+1 cells in the active set in descending order of Ec/No, and mark the cells respectively as a cell with the highest Ec/No, a cell with the second highest Ec/No, a cell with the third highest Ec/No, . . . , a cell with the $(n+1)^{th}$ highest Ec/No, and respectively calculate Ec/No differences between the cell with the highest Ec/No and the cell with the second highest Ec/No, between the cell with the highest Ec/No and the cell with the third highest Ec/No, . . . , between the cell with the highest Ec/No and the cell with the $(n+1)^{th}$ highest Ec/No, where the Ec/No difference may be indicated by ΔEc/No.

The counting unit 102 may be specifically configured to determine whether the ΔEc/No between the cell with the highest Ec/No and the cell with the second highest Ec/No is less than the first threshold, and if yes, and use first measurement reports including the Ec/No value between the cell with the highest Ec/No and the cell with the second highest Ec/No as second measurement reports, count the quantity of the second measurement reports obtained through comparison between the cell with the highest Ec/No and the cell with the second highest Ec/No, and mark the counted report quantity as $N_{2,k}$, where k is the calculated ΔEc/No.

Similarly, the counting unit 102 continues to calculate the difference between the cell with the highest Ec/No and the cell with the third highest Ec/No, determines whether the ΔEc/No between the cell with the highest Ec/No and the cell with the third highest Ec/No is between the first threshold and a second threshold, and if yes, use first measurement reports including the Ec/No value between the cell with the highest Ec/No and the cell with the third highest Ec/No as second measurement reports, count the quantity of the second measurement reports obtained through comparison with the cell with the third highest Ec/No, and mark the quantity as $N_{3,k}$.

The existing protocol specifies that a maximum of six cells is configured in an active set, that is, the UE is allowed to access six radio links simultaneously. Normally, to avoid increase of system interference and resource waste caused by excessive radio link access, generally only two or three cells are configured in the active set. Therefore, if there are multiple radio links, counting may also be performed on the multiple links according to the foregoing step, and a quantity of the second measurement reports obtained through difference comparison between the cell with the highest Ec/No and the cell with the $(n+1)^{th}$ highest Ec/No may be marked as $N_{n+1,k}$.

It is understandable that the counting unit 102 may count the quantity of second measurement reports in first measurement reports reported by all UEs in a particular serving cell in a particular period. The first threshold is applicable to counting of second measurement reports of all UEs.

In specific implementation, a corresponding counter may be set according to a process of calculating a signal strength difference. Each time when it is determined that a signal strength difference between two specific cells in a particular measurement report is in a particular threshold interval, 1 is added to the corresponding counter, and after all UEs in the serving cell are traversed in a statistical period, the entire counting process is complete. For example, corresponding to a difference between a cell with the highest signal strength and a cell with the second highest signal strength, a counter count-1 is set, and $N_{3,k}$ is counted; corresponding to a difference between the cell with the highest signal strength and a cell with the third highest signal strength, a counter count-2 is set, and $N_{3,k}$ is counted; . . . ; corresponding to a difference between the cell with the highest signal strength and a cell with the $(n+1)^{th}$ highest signal strength, a corresponding counter count-n is set, and $N_{n+1,k}$ is counted.

A second calculation unit 103 may be configured to calculate a probability distribution of the second measurement reports in the first measurement reports.

Optionally, the second calculation unit 103 may calculate the probability distribution of the second measurement reports in the first measurement reports according to a formula $$P_k = \sum_{t=0}^{t=k} N_k / \text{Sum},$$

where k indicates the signal strength difference obtained through calculation (k≥0 and k is an integer), $N_k$ indicates a quantity of the second measurement reports corresponding to the signal strength difference, and Sum indicates a quantity of the first measurement reports.

For example, an Ec/No difference interval is set to [0 dB, 1 dB], that is, the first threshold is 1 dB; a total quantity $N_{2,k}$ of second measurement reports that are reported by all UEs in a particular serving cell in a particular period and in which ΔEc/No between the cell with the highest signal strength and the cell with the second highest signal strength is within [0 dB, 1 dB] is counted and obtained, and therefore correspondingly, $$P_{2,k} = \sum_{t=0}^{t=k} N_{2,k} / \text{Sum};$$

a total quantity $N_{3,k}$ of second measurement reports that are reported by all UEs in a particular serving cell in a particular period and in which ΔEc/No between the cell with the highest signal strength and the cell with the third highest signal strength is within a range of [0 dB, 1 dB] is counted and obtained, and therefore $$P_{3,k} = \sum_{t=0}^{t=k} N_{2,k} / \text{Sum}.$$

After a probability distribution of second measurement reports reported by all UEs in a particular serving cell in a particular period is counted, a cumulative probability distribution curve of second measurement reports in different signal strength difference intervals within a signal coverage area of the cell may be obtained. Because presence of more than two cells in the active set indicates that the UE has begun to perform a soft handover, after the quantity of second measurement reports is counted with respect to signal strength differences between cells in the active set, a distribution of users performing soft handovers in a corresponding signal strength difference interval may be learned.

A mapping unit 104 may be configured to acquire a soft handover rate of the original serving cell according to the probability distribution.

The mapping unit 104 may be specifically configured to map the probability distribution to the soft handover rate of the serving cell according to a formula $$f(k) = \sum_{i=1}^{i=n} P_{i,k},$$

where k indicates the signal strength difference (k>0 and k is an integer), i indicates sequence numbers of n (n≥2) first neighboring cells sorted in descending order of the signal strength values, and $P_{i,k}$ indicates the probability distribution, in the first measurement reports, of the second measurement reports corresponding to the first neighboring cells.

For example, the Ec/No difference interval is set to [0 dB, 1 dB], that is, the first threshold is 1 dB, and three cells are configured in the active set of the UE in the serving cell; therefore, $f(k)=P_{2,k}+P_{3,k}$, that is, the soft handover rate is equivalent to the general probability distribution of the second measurement reports in the Ec/No difference interval. Generally, a higher signal strength difference between two neighboring cells indicates a higher probability of presence of second measurement reports in a corresponding signal strength interval, and also a higher equivalent soft handover rate indicates a higher resource usage rate.

Optionally, a mapping table between the probability distribution and the soft handover rate may be designed according to the foregoing calculation process, and a search is performed when the soft handover rate of the cell needs to be updated. When the user distribution in the cell changes, the probability distribution of second measurement reports may be recalculated, the corresponding soft handover rate may be calculated, and the mapping table may be updated.

A parameter adjustment unit 105 may be configured to adjust soft handover parameters so as to reach the soft handover rate.

Optionally, the soft handover parameters include a threshold for an event 1A and a threshold for an event 1B. The event 1A may be used to indicate that a cell is added to the active set, and is also referred to as a radio link increase threshold. In contrast to the event 1A, the event 1B indicates that signal quality of a target cell deteriorates and leaves a reporting range relative to quality of the active set. The event 1B may be used to indicate that the cell is deleted from the active set, and is also referred to as a radio link reduction threshold. Increasing the threshold for the event 1A may make it more difficult to add the cell to the active set. Similarly, reducing the threshold for the event 1B may make it easier to delete the cell from the active set. In this way, an objective of controlling a cell quantity in the active set and reducing the soft handover rate is achieved.

Specifically, according to a cell planning requirement, a target soft handover rate may be selected from the mapping table determined by the mapping unit 104, and a threshold interval of the soft handover rate to be adjusted to may be determined. For example, the target soft handover rate is [30%, 40%], the target threshold for the event 1A is set to $k_1$ dB, and the target threshold for the event 1B is set to $k_2$ dB; assume $f(k_1) \geq 30\%$, $f(k_1-1) \leq 30\%$ and $f(k_2) \geq 40\%$, $f(k_2-1) \leq 40\%$, and parameter values to be adjusted to may be calculated.

Optionally, when the apparatus for controlling a soft handover rate according to the embodiment of the present invention is integrated in a base station control device such as an RNC, the adjusted soft handover parameters may be directly delivered by the base station control device to each base station for execution. Optionally, when the apparatus for controlling a soft handover rate is an independent device, the apparatus may send the adjusted parameters to the base station control device through a communications link, and the base station control device updates the stored soft handover parameter values and delivers the adjusted parameters to each base station.

With the apparatus for controlling a soft handover rate provided by the embodiment of the present invention, a distribution of cell signal strengths that is received by user equipment is obtained according to measurement reports, a mapping relationship between soft handover parameters and air interface quality is determined, and the soft handover parameters are adjusted according to the mapping relationship. Adjusting soft handover parameters of a cell according to signal quality of the cell can improve a soft handover success rate of an area in which the soft handover success rate is bad, and improve soft handover parameters of an area in which signal quality is good. In this way, on a premise that communication quality of the area in which signal quality is good is maintained, the soft handover rate of the area is reduced, and a system capacity is increased.

Optionally, in another embodiment of the present invention, the counting unit 104 may be further configured to:

establish a statistical matrix of the quantity of the first measurement reports, the signal strength value of the original serving cell, and signal strength differences between the original serving cell and second neighboring cells, where the second neighboring cells include the first neighboring cells;

where the signal strength differences between the original serving cell and the second neighboring cells may be calculated by the first calculation unit 101.

Optionally, only the signal strength differences between the original serving cell and the first neighboring cells in the same active set may be calculated; or the signal strength differences between the original serving cell and all neighboring cells may be calculated, that is, it is not required that the neighboring cells should be in the active set of the UE. For example, as specified in the existing protocol, a maximum of 64 neighboring cells may be configured for a serving cell, and therefore signal strength differences between the 64 neighboring cells and the serving cell may be calculated. A range calculated is determined according to an operational capability of the system. If a larger quantity of neighboring cells is calculated, an obtained probability distribution result is closer to an actual distribution of first measurement reports, and the result is more accurate.

Specifically, a three-dimensional statistical matrix may be established by using the quantity of the first measurement reports reported by all UEs in the same serving cell in a particular period, the signal strength value, of the serving cell, in each first measurement report reported by each UE, and the signal strength difference that is between the serving cell and the neighboring cell and obtained through calculation according to each first measurement report. A physical meaning of the three-dimensional statistical matrix lies in that the quantity of the first measurement reports corresponding to the signal strength value of the specific serving cell and the signal strength difference between the specific serving cell and the neighboring cell is counted. For example, assuming that the signal strength value of the serving cell is −1 dB, and that an interval of signal strength differences between the serving cell and the neighboring cell is [0 dB, 20 dB], the quantity A of the first measurement reports with the signal strength difference k∈[0 dB, 20 dB] (k≥0 and k is an integer) may be counted. As specified in the existing protocol, the signal strength value of the serving cell is an integer between 0 dB and 25 dB, and corresponding to different signal strength values, the corresponding quantity of first measurement reports may be counted, and a correspondence table between the three reference quantities is established. The statistical matrix may be expressed as A (m, k), where A indicates a quantity of the first measurement reports, m indicates the signal strength value of the serving cell, and k indicates the signal strength difference between the serving cell and the neighboring cell.

The apparatus for controlling a soft handover rate may further include a third counting unit 106, which may be configured to calculate a cumulative probability distribution of the first measurement reports according to a formula $$P(j, K) = \sum_{j=J}^{j=j_{max}} A(j, K) \bigg/ \sum_{j=J_{min}}^{j=j_{max}} A(j, K).$$

The probability distribution indicates a probability of first measurement reports in which measured signal strength values of the original serving cell are greater than J when the signal strength difference is set to a specific K value and the signal strength value is J∈[J$_{min}$, J$_{max}$] in a statistical period, where J$_{min}$ and J$_{max}$ indicate a minimum value and a maximum value of the measured signal strength values, J indicates the signal strength value of the original serving cell, and K indicates the signal strength difference between the original serving cell and the neighboring cell. In the embodiment of the present invention, settings of J$_{min}$ and J$_{max}$ are not particularly limited, and may be determined according to the system running status. As specified in the existing protocol, the signal strength value of the cell needs to be within a range of [−25 dB, 0 dB], and therefore, the settings may be J$_{min}$=−25 and J$_{max}$=0 dB. When the signal strength difference changes in a particular interval, a corresponding cumulative probability distribution curve of the first measurement reports may be obtained. The curve may represent a change of air interface quality when a soft handover occurs in the statistical period.

Generally, if the signal strength difference between two neighboring cells is greater, the probability distribution of the first measurement reports is denser, which indicates better air interface quality when a soft handover occurs. If the corresponding air interface quality is worse, a cell individual offset (CIO, Cell Individual Offset) in the soft handover parameters may be calculated and adjusted according to the probability distribution. The CIO is set for a cell to solve a call drop and improve communication quality, and is a cell-level soft handover parameter. By configuring the CIO for a cell that is to be added to the active set, the target cell can meet a condition of the event 1A earlier, a neighboring cell link can be added in advance, and a call drop possibility can be reduced.

Specifically, the apparatus for controlling a soft handover rate may further include a fourth calculation unit 107, which may be configured to calculate a corresponding K value by substituting a preset second threshold and a preset third threshold into the formula $$P(j, K) = \sum_{j=J}^{j=j_{max}} A(j, K) \bigg/ \sum_{j=J_{min}}^{j=j_{max}} A(j, K),$$

where the second threshold indicates an expected value of the signal strength value of the original serving cell, and the third threshold indicates an expected value of the probability distribution of the first measurement reports. The third threshold corresponds to air interface quality during a soft handover.

The parameter adjustment unit 105 may be further configured to adjust the CIO according to the K value.

Specifically, in the fourth calculation unit 107, the second threshold and the third threshold are substituted into the formula P (j, K). Assuming that P (second threshold, K) is greater than the third threshold, and that P (second threshold, K−1) is less than the third threshold, the corresponding K may be calculated. If multiple K values are obtained through calculation, a minimum value is selected. A correction may be made to the CIO by using the K value obtained through calculation, including: calculating a difference between the K value and the adjusted threshold for 1A to obtain the CIO, that is, using the difference as the CIO.

In this embodiment, after the soft handover rate is adjusted according to the air interface quality, monitoring of the air interface quality of the system is continued, and by modifying the CIO by using the foregoing method, communication quality of the user equipment that performs a soft handover is maintained, and a balance between increasing the system capacity and maintaining the communication quality can be achieved.

Figure 3:
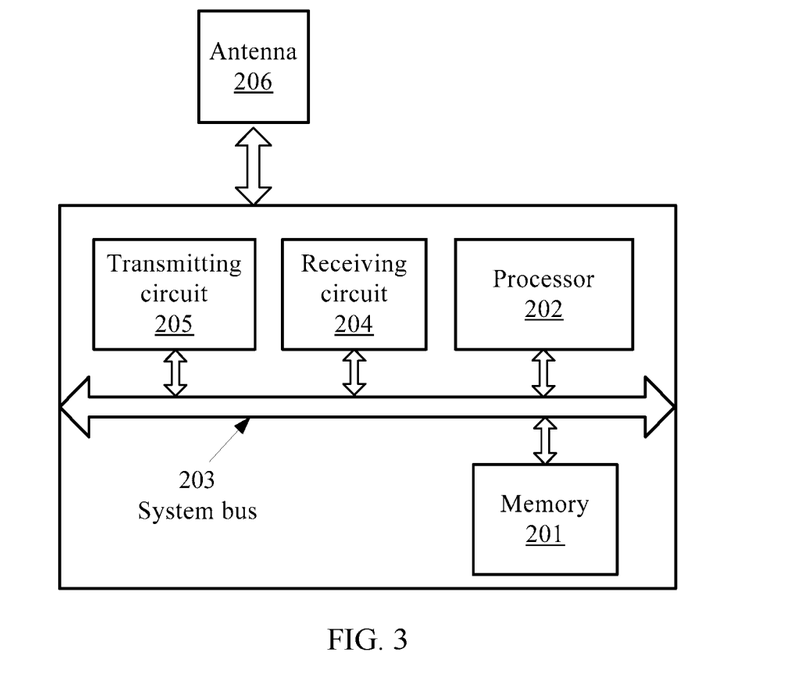
FIG. 3 is a schematic diagram of an apparatus for controlling a soft handover rate according to an embodiment of the present invention.

An embodiment of the present invention provides an apparatus for controlling a soft handover rate shown in FIG. 3, where the apparatus includes a memory 201, a processor 202, and a bus system 203.

The apparatus for controlling a soft handover rate may further include a receiving circuit 204, a transmitting circuit 205, an antenna 206 and the like. The processor 202 controls an operation of the apparatus. The processor 202 may also be called a CPU (Central Processing Unit, central processing unit). The memory 201 may include a read-only memory and a random access memory, and provides an instruction and data to the processor 202. A part of the memory 201 may further include a non-volatile random access memory (NVRAM). In a specific application, the transmitting circuit 204 and the receiving circuit 205 may be coupled to the antenna 206. All components of the apparatus may be coupled by the bus system 203. The bus system 203 may include a power bus, a control bus, a status signal bus, and the like in addition to a data bus. However, for clear description, various types of buses in the figure are marked as the bus system 203.

The memory 201 stores an instruction so that the processor 202 executes the following operations: determining, according to a first measurement report reported by user equipment UE, a signal strength difference between an original serving cell of the UE and a first neighboring cell of the original serving cell, where the first measurement report includes signal strength values that are obtained by the UE through measurement, of the serving cell and the first neighboring cell, and the original serving cell and the first neighboring cell belong to an active set of the UE; counting a quantity of the first measurement reports reported by the UE in a particular period; counting a quantity of second measurement reports, where the second measurement reports are used to indicate the first measurement reports in which the signal strength difference is less than or equal to a first threshold; calculating a probability distribution of the second measurement reports in the first measurement reports; acquiring a soft handover rate of the serving cell according to the probability distribution; and adjusting soft handover parameters so as to reach the soft handover rate.

The soft handover parameters include a threshold for an event 1A and a threshold for an event 1B.

Optionally, the memory 201 may further store an instruction so that the processor 202 executes the following operation:

calculating the probability distribution of the second measurement reports in the first measurement reports according to a formula $$P_k = \sum_{t=0}^{t=k} N_k / \mathrm{Sum},$$

where k indicates the signal strength difference (k≥0 and k is an integer), $N_k$ indicates a quantity of the second measurement reports corresponding to the signal strength difference, and Sum indicates a quantity of the first measurement reports.

Optionally, the memory 201 may further store an instruction so that the processor 202 executes the following operation:

determining signal strength differences between the serving cell of the UE and n (n≥1) first neighboring cells, where the serving cell and the first neighboring cells are in a same active set, and the n (n≥1) first neighboring cells are sorted in descending order of signal strength values.

The signal strength values may be Ec/No or may be RSCP.

Optionally, the memory 201 may further store an instruction so that the processor 202 executes the following operation:

mapping the probability distribution to the soft handover rate of the serving cell according to a formula $$f(k) = \sum_{i=1}^{i=n} P_{i,k},$$

where k indicates the signal strength difference (k>0), i indicates sequence numbers of n (n≥2) first neighboring cells sorted in descending order of the signal strength values, and $P_{i,k}$ indicates the probability distribution, in the first measurement reports, of the second measurement reports corresponding to the first neighboring cells.

Optionally, in another embodiment of the present invention, the memory 201 may further store an instruction so that the processor 202 executes the following operations:

establishing a statistical matrix of the quantity of the first measurement reports, the signal strength value, of the original serving cell, measured by the UE, and signal strength differences between the original serving cell and second neighboring cells, where the second neighboring cells include the first neighboring cells; calculating a cumulative probability distribution of the first measurement reports according to a formula $$P(J, K) = \sum_{j=j_{min}}^{j=J} A(j, K) \bigg/ \sum_{j=j_{min}}^{j=j_{max}} A(j, K),$$

where J indicates the signal strength value of the original serving cell, and K indicates the signal strength difference between the original serving cell and the neighboring cell; setting a second threshold and a third threshold, where the second threshold is used to indicate the signal strength value of the original serving cell corresponding to a soft handover of the UE, and the third threshold is used to indicate a probability distribution rate corresponding to air interface quality; calculating a corresponding K value by substituting the preset second threshold and third threshold into the formula $$P(j, K) = \sum_{j=J}^{j=j_{max}} A(j, K) \bigg/ \sum_{j=j_{min}}^{j=j_{max}} A(j, K),$$

where the second threshold indicates the signal strength value of the original serving cell, and the third threshold indicates an expected value of the probability distribution of the first measurement reports; and adjusting a cell individual offset (CIO) according to the K value.

Optionally, the memory 201 may further store an instruction so that the processor 202 executes the following operation: calculating a difference between the K value and the adjusted threshold for 1A to obtain the CIO.

Optionally, the memory 201 may further store an instruction so that the processor 202 executes the following operation: if multiple K values are obtained through calculation, selecting a minimum K value for adjusting the CIO.

The method disclosed by the embodiment of the present invention may be applied in the processor 202 or implemented by the processor 202. The processor 202 may be an integrated circuit chip and has a signal processing capability. In an implementation process, each step of the method may be completed by using an integrated logic circuit of hardware in the processor 202 or an instruction in a form of software. The foregoing processor 202 may be a general purpose processor, a digital signal processor (DSP), an application-specific integrated circuit (ASIC), a field programmable gate array (FPGA), or another programmable logical device, discrete gate or transistor logical device, or discrete hardware component. The processor 202 may implement or execute methods, steps and logical block diagrams disclosed in the embodiments of the present invention. The general purpose processor may be a microprocessor or the processor may be any conventional processor and the like. Steps of the methods disclosed with reference to the embodiments of the present invention may be directly executed and completed by means of a hardware decoding processor, or may be executed and completed by using a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory 201, and the processor 202 reads information in the memory 201 and completes the steps in the foregoing methods in combination with hardware of the processor 202.

The method executed by the apparatus for controlling a soft handover rate is not repeated herein. Reference may be made to the method executed and the function implemented by each functional module in the apparatus for controlling a soft handover rate in the embodiment shown in FIG. 2.

With the apparatus for controlling a soft handover rate according to the embodiment of the present invention, a distribution of cell signal strengths that is received by user equipment is obtained according to measurement reports, a mapping relationship between soft handover parameters and air interface quality is determined, and the soft handover parameters are adjusted according to the mapping relationship. Adjusting soft handover parameters of a cell according to signal quality of the cell can reduce a soft handover rate and increase a capacity on a premise that communication quality is maintained. Further, after the soft handover rate is adjusted according to the air interface quality, monitoring of the air interface quality of the system is continued, and by modifying specific cell handover parameters, communication quality of the user equipment that performs a soft handover is maintained, and a balance between increasing the system capacity and maintaining the communication quality is achieved.

Figure 4:
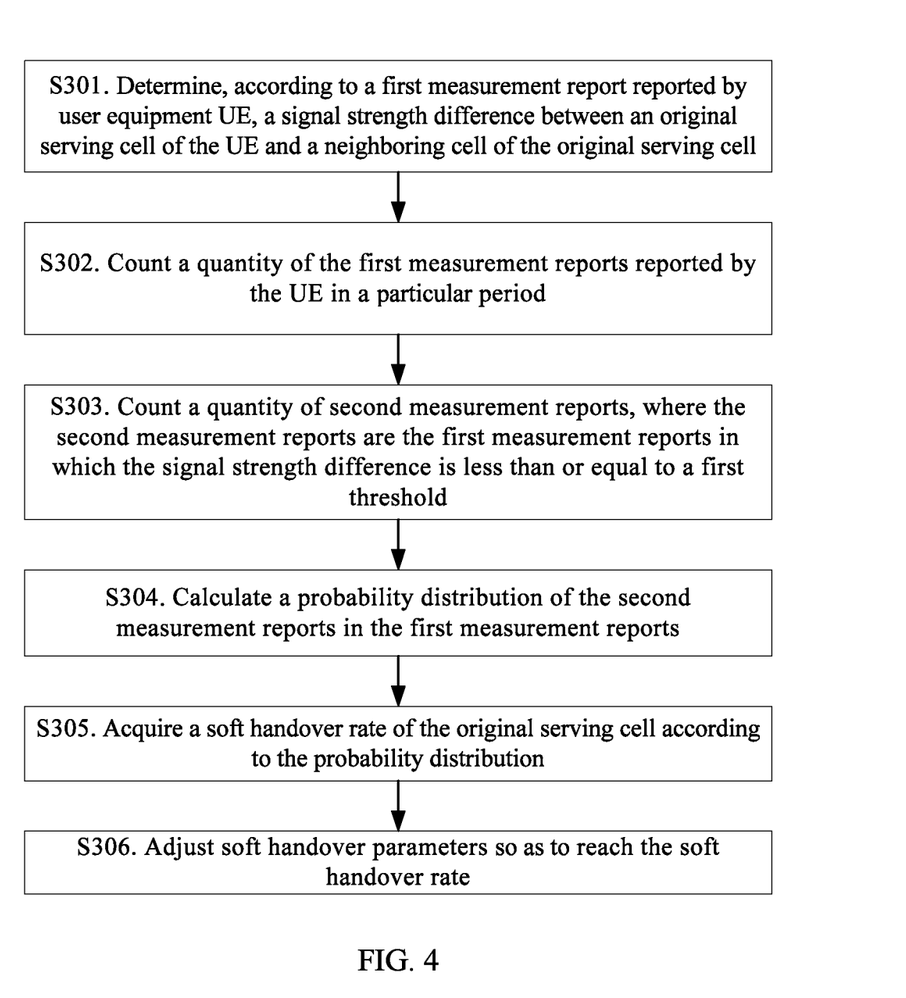
FIG. 4 is a schematic flowchart of a method for controlling a soft handover rate according to an embodiment of the present invention.

An embodiment of the present invention provides a method for controlling a soft handover rate. The method may be executed by the apparatus for controlling a soft handover rate in the embodiment shown in FIG. 2 or FIG. 3. As shown in FIG. 4, the procedure of the method includes at least steps S301 to S305.

S301. Determine, according to a first measurement report reported by user equipment UE, a signal strength difference between an original serving cell of the UE and a first neighboring cell of the original serving cell, where the first measurement report includes signal strength values that are obtained by the UE through measurement, of the original serving cell and the first neighboring cell, and the original serving cell and the first neighboring cell belong to an active set of the UE.

Optionally, the signal strength value may be represented by Ec/No or RSCP.

The UE may report the first measurement report periodically or based on event triggering.

S302. Count a quantity of the first measurement reports reported by the UE in a particular period.

A statistical period may be determined according to a network running requirement, which is not particularly limited in the embodiment of the present invention.

S303. Count a quantity of second measurement reports, where the second measurement reports are the first measurement reports in which the signal strength difference is less than or equal to a first threshold.

A value of the first threshold may be determined according to signal quality in an area and a signal difference between two neighboring cells in which a soft handover of the UE may occur, which is not particularly limited in the embodiment of the present invention, and is not repeated herein. For details, reference may be made to related descriptions in other embodiments of the present invention.

S304. Calculate a probability distribution of the second measurement reports in the first measurement reports.

Optionally, the probability distribution of the second measurement reports in the first measurement reports may be calculated according to a formula $$P_k = \sum_{t=0}^{t=k} N_k / \text{Sum},$$

where k indicates the signal strength difference obtained through calculation ($k \geq 0$ and k is an integer), $N_k$ indicates a quantity of the second measurement reports corresponding to the signal strength difference, and Sum indicates a quantity of the first measurement reports. The calculation process is not repeated herein. For details, reference may be made to related descriptions in other embodiments of the present invention.

S305. Acquire a soft handover rate of the original serving cell according to the probability distribution.

Optionally, the probability distribution may be mapped to the soft handover rate of the serving cell according to a formula $$f(k) = \sum_{i=1}^{i=n} P_{i,k},$$

where k indicates the signal strength difference ($k > 0$ and k is an integer), i indicates sequence numbers of n ($n \geq 2$) first neighboring cells sorted in descending order of the signal strength values, and $P_{i,k}$ indicates the probability distribution, in the first measurement reports, of the second measurement reports corresponding to the first neighboring cells. The calculation process is not repeated herein. For details, reference may be made to related descriptions in other embodiments of the present invention.

Optionally, a mapping table between the probability distribution and the soft handover rate may be designed according to the foregoing calculation process, and a search is performed when the soft handover rate of the cell needs to be updated. When the user distribution in the cell changes, the probability distribution of second measurement reports may be recalculated, the corresponding soft handover rate may be calculated, and the mapping table may be updated.

S306. Adjust soft handover parameters so as to reach the soft handover rate.

Optionally, the soft handover parameters include a threshold for an event 1A and a threshold for an event 1B. The adjustment process is not repeated herein. For details, reference may be made to related descriptions in other embodiments of the present invention.

Optionally, the adjusted soft handover parameters may be directly delivered to each base station for execution; or the adjusted soft handover parameters may be sent to a base station control device through a communications link, and the base station control device updates the stored soft handover parameter values and delivers the adjusted parameters to each base station.

Figure 5:
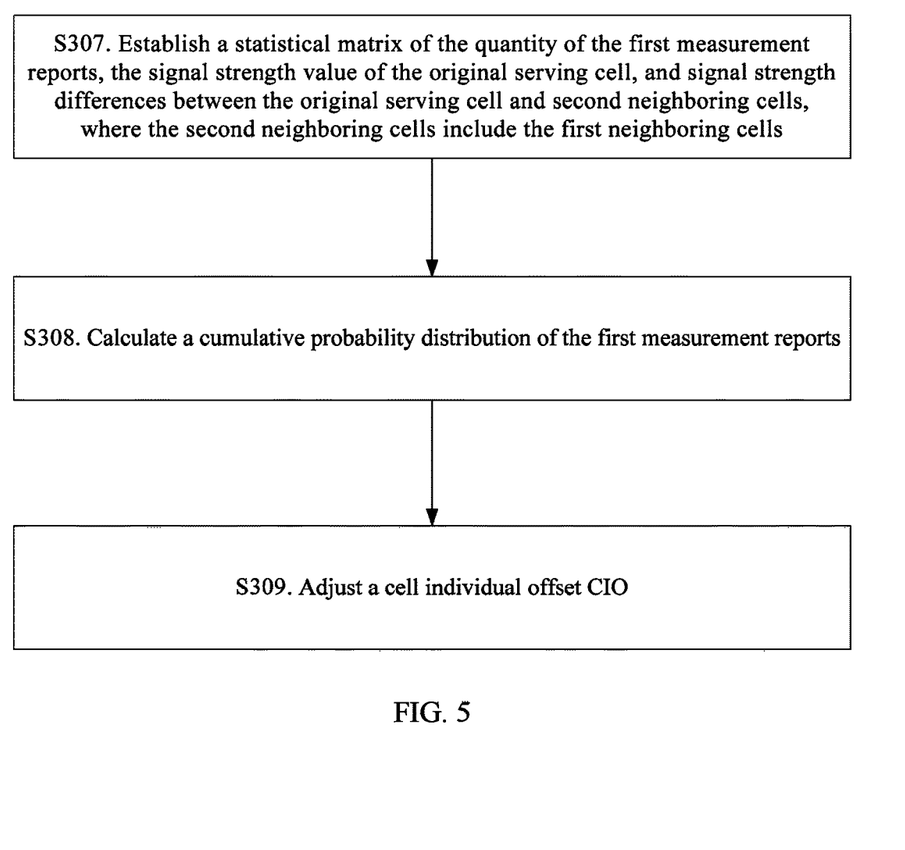
FIG. 5 is a schematic flowchart of another method for controlling a soft handover rate according to an embodiment of the present invention.

Optionally, in another embodiment of the present invention, as shown in FIG. 5, the method may further include steps S307 to S309.

S307. Establish a statistical matrix of the quantity of the first measurement reports, the signal strength value of the original serving cell, and signal strength differences between the original serving cell and second neighboring cells, where the second neighboring cells include the first neighboring cells.

Specifically, a three-dimensional statistical matrix may be established by using the quantity of the first measurement reports reported by all UEs in the same serving cell in a particular period, the signal strength value, of the serving cell, in each first measurement report reported by each UE, and the signal strength difference that is between the serving cell and the neighboring cell and obtained through calculation according to each first measurement report. The process description is not repeated herein. For details, reference may be made to related content in other embodiments of the present invention.

S308. Calculate a cumulative probability distribution of the first measurement reports according to a formula $$P(j, K) = \sum_{j=J}^{j=j_{max}} A(j, K) \bigg/ \sum_{j=j_{min}}^{j=j_{max}} A(j, K).$$

The probability distribution indicates a probability of first measurement reports in which measured signal strength values of the original serving cell are greater than J when the signal strength difference is set to a specific K value and the signal strength value is $J \in [J_{min}, J_{max}]$ in a statistical period, where $J_{min}$ and $J_{max}$ indicate a minimum value and a maximum value of the measured signal strength values, j indicates a variable of the signal strength value of the original serving cell, J indicates the measured signal strength value of the original serving cell, and K indicates the signal strength difference between the original serving cell and the neighboring cell. In the embodiment of the present invention, settings of $J_{min}$ and $J_{max}$ are not particularly limited, and may be determined according to the system running status.

S309. Adjust a cell individual offset (CIO) according to the K value obtained through calculation.

Specifically, a second threshold and a third threshold are substituted into the formula P (j, K). Assuming that P (second threshold, K) is greater than the third threshold, and that P (second threshold, K−1) is less than the third threshold, the corresponding K may be calculated. If multiple K values are obtained through calculation, a minimum value is selected.

A correction may be made to the CIO by using the K value obtained through calculation, including: calculating a difference between the K value and the adjusted threshold for 1A to obtain the CIO, that is, using the difference as the CIO.

It is understandable that the method for controlling a soft handover rate in the foregoing embodiment may be executed by the apparatus for controlling a soft handover rate in the embodiment shown in FIG. 2 or FIG. 3. The description of steps of the method is not repeated herein. For details, reference may be made to functions of related modules in the apparatus embodiment part.

With the apparatus for controlling a soft handover rate according to the embodiment of the present invention, a distribution of cell signal strengths that is received by user equipment is obtained according to measurement reports, a mapping relationship between soft handover parameters and air interface quality is determined, and the soft handover parameters are adjusted according to the mapping relationship. Adjusting soft handover parameters of a cell according to signal quality of the cell can reduce a soft handover rate and increase a capacity on a premise that communication quality is maintained. Further, after the soft handover rate is adjusted according to the air interface quality, monitoring of the air interface quality of the system is continued, and by modifying specific cell handover parameters, communication quality of the user equipment that performs a soft handover is maintained, and a balance between increasing the system capacity and maintaining the communication quality is achieved.

A person skilled in the art may clearly understand that for the purpose of convenient and brief description, mutual reference may be made for a detailed working process of each functional unit in the foregoing apparatus and that of the method, which is not described repeatedly.

In the several embodiments provided in the present application, it should be understood that the disclosed device and method may be implemented in other manners. For example, the described apparatus embodiment is merely exemplary. For example, the module division is merely logical function division and may be other division in actual implementation. For example, a plurality of modules or components may be combined or integrated into another device, or some features may be ignored or not performed.

In addition, functional modules in the embodiments of the present invention may be integrated into one processing module, or each of the modules may exist alone physically, or two or more modules are integrated into one module.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, an optical disc, or the like.

Finally, it should be noted that the foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A computer system for controlling a soft handover rate, comprising:
　　a memory configured to store a computer program;
　　a processor configured to read the computer program stored in the memory and perform steps of:
　　determining, according to a first measurement report reported by user equipment (UE), a signal strength difference between an original serving cell of the UE and a neighboring cell of the original serving cell, wherein the first measurement report comprises signal strength values of the original serving cell and the neighboring cell that are obtained through measurement by the UE, and the original serving cell and the neighboring cell belong to an active set of the UE;
　　counting a quantity of the first measurement reports reported by the UE in a particular period;
　　counting a quantity of second measurement reports, wherein the second measurement reports are the first measurement reports in which the signal strength difference is less than or equal to a first threshold;
calculating a probability distribution of the second measurement reports in the first measurement reports;
acquiring a soft handover rate of the original serving cell according to the probability distribution; and
adjusting soft handover parameters so as to reach the soft handover rate;
wherein the processor is configured to calculate the probability distribution of the second measurement reports in the first measurement reports according to a formula $$P_k = \sum_{t=0}^{t=k} N_k / \text{Sum},$$

wherein k indicates the signal strength difference (k≥0 and k is an integer), $N_k$ indicates a quantity of the second measurement reports corresponding to the signal strength difference, and Sum indicates a quantity of the first measurement reports.

2. The computer system according to claim 1, wherein the processor is configured to determine signal strength differences between the serving cell of the UE and n (n≥1) neighboring cells, wherein the serving cell and the neighboring cells are in the same active set, and the n (n≥1) neighboring cells are sorted in descending order of signal strength values.

3. The computer system according to claim 1, wherein the processor is configured to map the probability distribution to the soft handover rate of the serving cell according to a formula $$f(k) = \sum_{i=1}^{i=n} P_{i,k},$$

wherein k indicates the signal strength difference (k>0), i indicates sequence numbers of n (n≥2) neighboring cells sorted in descending order of the signal strength values, and $P_{i,k}$ indicates the probability distribution, in the first measurement report, of the second measurement reports corresponding to the neighboring cells.

4. The computer system according to claim 1, wherein the processor is configured to adjust a threshold for a first event and a threshold for a second event so as to reach the soft handover rate.

5. The computer system according to claim 1, wherein the processor is further configured to
establish a statistical matrix of the quantity of the first measurement reports, the signal strength value, of the original serving cell, measured by the UE, and the signal strength difference between the original serving cell and the neighboring cell;
calculate the probability distribution rate according to a formula $$P(J, K) = \sum_{j=J_{min}}^{j=J} A(j, K) / \sum_{j=j_{min}}^{j=j_{max}} A(j, K),$$

wherein J indicates the signal strength value of the original serving cell, and K indicates the signal strength difference between the original serving cell and the neighboring cell;
set a second threshold and a third threshold, wherein the second threshold is used to indicate the signal strength value of the original serving cell corresponding to a soft handover of the UE, and the third threshold is used to indicate a probability distribution rate corresponding to air interface quality;
calculate a corresponding K value by substituting the preset second threshold and third threshold into the formula $$P(j, K) = \sum_{j=J}^{j=j_{max}} A(j, K) / \sum_{j=j_{min}}^{j=j_{max}} A(j, K),$$

wherein the second threshold indicates the signal strength value of the original serving cell, and the third threshold indicates an expected value of the probability distribution of the first measurement reports; and
adjust a cell individual offset CIO according to the K value.

6. The computer system according to claim 5, wherein the processor is configured to calculate a difference between the K value and the adjusted threshold for the first event to obtain the CIO, wherein K indicates the signal strength difference between the original serving cell and the neighboring cell.

7. The computer system according to claim 6, wherein the processor is configured to select a minimum K value if multiple K values are obtained through calculation.

8. The computer system according to claim 1, wherein the signal strength value comprises a ratio of energy per modulating bit to the noise spectral density Ec/No, or received signal code power RSCP.

9. A method for controlling a soft handover rate, comprising:
determining, according to a first measurement report reported by user equipment (UE), a signal strength difference between an original serving cell of the UE and a neighboring cell of the original serving cell, wherein the first measurement report comprises signal strength values of the original serving cell and the neighboring cell that are obtained through measurement by the UE, and the original serving cell and the neighboring cell belong to an active set of the UE;
counting a quantity of the first measurement reports reported by the UE in a particular period;
counting a quantity of second measurement reports, wherein the second measurement reports are the first measurement reports in which the signal strength difference is less than or equal to a first threshold;
calculating a probability distribution of the second measurement reports in the first measurement reports;
acquiring a soft handover rate of the original serving cell according to the probability distribution; and
adjusting soft handover parameters so as to reach the soft handover rate;
wherein the calculating a probability distribution of the second measurement reports in the first measurement reports comprises:
calculating the probability distribution of the second measurement reports in the first measurement reports according to a formula $$P_k = \sum_{t=0}^{t=k} N_k / \text{Sum},$$

wherein k indicates the signal strength difference (k≥0 and k is an integer), $N_k$ indicates a quantity of the second measurement reports corresponding to the signal strength difference, and Sum indicates a quantity of the first measurement reports.

10. The method according to claim 9, wherein the determining a signal strength difference between an original serving cell of the UE and a neighboring cell of the original serving cell comprises:
determining signal strength differences between the serving cell of the UE and n (n≥1) neighboring cells, wherein the serving cell and the neighboring cells are in the same active set, and the n (n≥1) neighboring cells are sorted in descending order of signal strength values.

11. The method according to claim 9, wherein the acquiring a soft handover rate of the original serving cell according to the probability distribution comprises:
mapping the probability distribution to the soft handover rate of the serving cell according to a formula $$f(k) = \sum_{i=1}^{i=n} P_{i,k},$$

wherein k indicates the signal strength difference (k>0), i indicates sequence numbers of n (n≥2) neighboring cells sorted in descending order of the signal strength values, and $P_{i,k}$ indicates the probability distribution, in the first measurement report, of the second measurement reports corresponding to the neighboring cells.

12. The method according to claim 9, wherein the adjusting soft handover parameters comprises: adjusting a threshold for a first event and a threshold for a second event.

13. The method according to claim 9, wherein after the adjusting soft handover parameters so as to reach the soft handover rate, the method further comprises:
establishing a statistical matrix of the quantity of the first measurement reports, the signal strength value, of the original serving cell, measured by the UE, and the signal strength difference between the original serving cell and the neighboring cell;
calculating the probability distribution rate according to a formula $$P(J, K) = \sum_{j=j_{min}}^{j=J} A(j, K) \bigg/ \sum_{j=j_{min}}^{j=j_{max}} A(j, K),$$

wherein J indicates the signal strength value of the original serving cell, and K indicates the signal strength difference between the original serving cell and the neighboring cell;

setting a second threshold and a third threshold, wherein the second threshold is used to indicate the signal strength value of the original serving cell corresponding to a soft handover of the UE, and the third threshold is used to indicate a probability distribution rate corresponding to air interface quality;
calculating a corresponding K value by substituting the preset second threshold and third threshold into the formula $$P(j, K) = \sum_{j=J}^{j=j_{max}} A(j, K) \bigg/ \sum_{j=j_{min}}^{j=j_{max}} A(j, K),$$

wherein the second threshold indicates the signal strength value of the original serving cell, and the third threshold indicates an expected value of the probability distribution of the first measurement reports; and
adjusting a cell individual offset CIO according to the K value.

14. The method according to claim 13, wherein the adjusting a CIO according to the K value comprises:
calculating a difference between the K value and the adjusted threshold for the first event to obtain the CIO, wherein K indicates the signal strength difference between the original serving cell and the neighboring cell.

15. The method according to claim 14, wherein the calculating a corresponding K value by substituting the preset second threshold and third threshold into the formula $$P(j, K) = \sum_{j=J}^{j=j_{max}} A(j, K) \bigg/ \sum_{j=j_{min}}^{j=j_{max}} A(j, K)$$

comprises:
if multiple K values are obtained through calculation, selecting a minimum K value.

16. The method according to claim 9, wherein:
the signal strength value comprises a ratio of energy per modulating bit to the noise spectral density Ec/No, or received signal code power RSCP.

* * * * *